July 31, 1928.
L. C. HUFF
1,679,218
SAFETY OR AUTOMATIC RELEASE VALVE
Filed Feb. 5, 1925
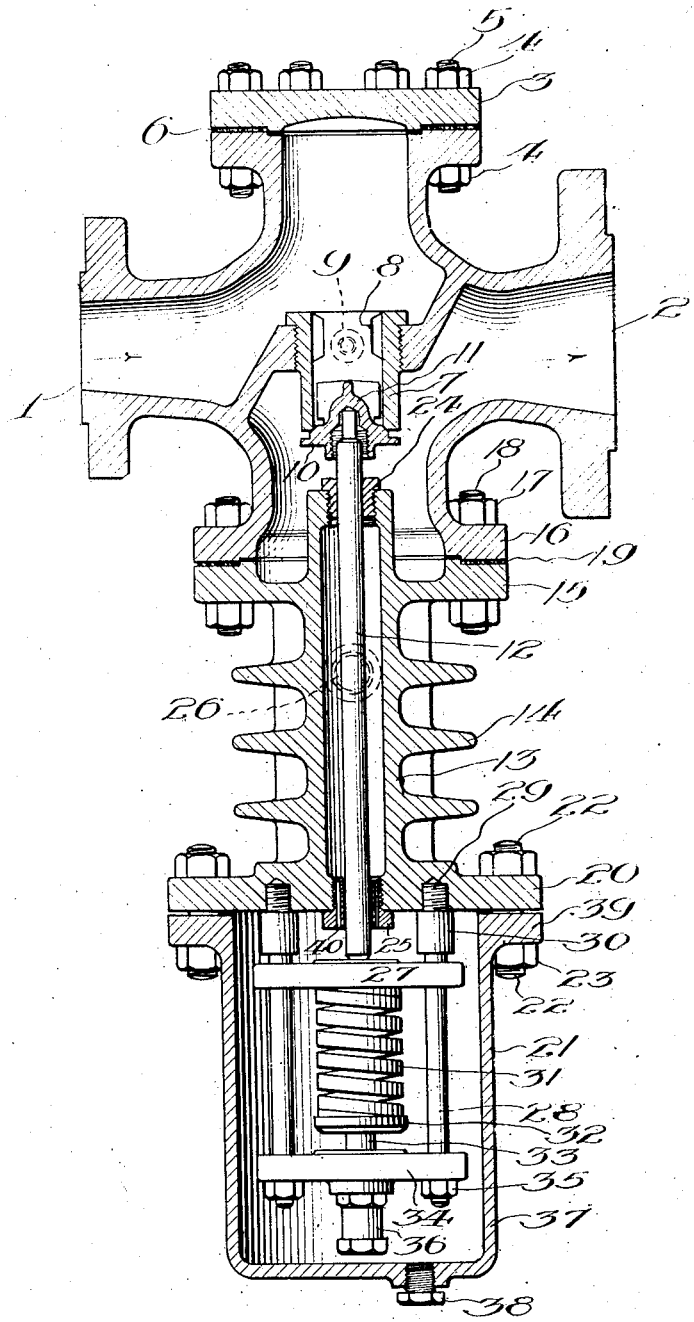

Patented July 31, 1928.

1,679,218

UNITED STATES PATENT OFFICE.

LYMAN C. HUFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

SAFETY OR AUTOMATIC RELEASE VALVE.

Application filed February 5, 1925. Serial No. 6,940.

This invention relates to improvements in a safety or automatic release valve and refers more particularly to safety valves utilized for the automatic release of the high gaseous or vapor pressure encountered in the cracking of petroleum oil.

The valve of the present invention has the advantage of being what is known as a relief valve having inlet and outlet in substantially the same plane as distinguished from an angle valve. Further, the spring which maintains tension on the valve seat is housed below the pipe carrying the hot vapors or gases, in order that the vapors and heat from said pipe which radiate upwardly are prevented from permeating the space around and between the spring, which in the present valves, causes distempering and oxidation and eventual loss of resiliency or tension of the spring. As a further advantage, the chamber in which the spring and communicating valve stem are positioned, is filled with a liquid medium, such as oil, thus maintaining said spring and valve stem in a bath of said oil.

Briefly, therefore, the features of the present invention resides in the positioning of the spring and valve stem below the valve and communicating pipes into which the valve is connected, and also the maintenance of said stem and spring in a bath of liquid, such as oil. Other features of novelty and utility will be brought out in the description of the valve in the following specification.

In the drawings, the single figure in the drawing is a vertical cross sectional view of a valve, utilizing my invention.

Referring in detail to the drawings, 1 designates the inlet and 2 the outlet of a standard form of safety valve, having a removable cap 3 held in position by the lock nuts 4 and bolts 5, and having the usual gasket 6. Interposed between the inlet 1 and outlet 2 is the hollow seat bushing 7 screw-threaded into place, provided with the lugs 8 provided with seat lock screw 9. Seating on the periphery of said hollow bushing 7 is the disk 10 having the raised central portion 11, to provide an internal recess in the disk 10, into which is fitted the upper end of the stem 12. This stem is supported within what may be termed a cooling chamber 13 having the circumferentially extending ribs 14, said cooling chamber being provided also with upper flange 15 adapted to be connected with the flange 16 of the upper body portion, the two flanges being held together by the securing nuts 17 and bolts 18, the usual gasket 19 being inserted therebetween to insure a tight fit. The cooling chamber 13 is also provided with the lower flange 20 adapted to be connected with the closed spring chamber 21 by means of the bolts 22 and securing nuts 23, the usual gasket being interposed at the point of connection.

Stem bushings 24 and 25 are screw threaded into the open ends of the cooling chamber 13, serving as guides for the stem. The cooling chamber 13 is provided with the tapped opening 26 for filling purposes; it being understood that said hole may be positioned at any height on the chamber.

The base of the stem 12 contacts an upper cross head 27 apertured near its ends to register with the yoke posts 28, the upper ends of the latter being screw threaded into the base of the cooling chamber 13, as shown at 29, a tight fit being insured by the nuts 30. Below the upper cross head 27 is a coil spring 31 provided at its base with the spring washer 32 and connecting piece 33 supported on the lower cross head 34, recessed similarly to upper cross head 27 to accommodate the yoke posts 28 and supported thereon by the securing nuts 35. Adjusting screws and lock nuts 36 are provided below the lower cross head 34. The spring, cross heads and yoke posts just described, are enclosed in the removable housing or cover 37, having lower drain plug 38 and removably connected to the cooling chamber 13 by flanges 39 contacting the flanges 20 of the chamber and held together by the screw bolts 22 and adjusting nuts 23.

The operation of the device should be apparent from the foregoing description. The arrangement is such that the coil spring 31 is first so adjusted as to compress when a pressure exerted on same is above a certain point. The upper cross head 27 is movable vertically in the yoke posts 28, while the lower cross head 34 remains stationary. When a pressure is built up in the inlet 1 above the adjusted tension of the spring 31, the disk 10 will be forced downwardly against the tension of said spring, thus forcing the disk 10 to be unseated, and forcing the stem 12 downwardly will cause the cross head 27 and spring 31 to be forced downwardly. Thus, the excess of pressure escapes past the seat of disk 10 and discharges through the outlet 2. When the pressure decreases, the adjusted tension of spring 31 returns the movable stem 12 and disk 10 to normal position. Oil or other liquid cooling medium may be introduced into the cooling chamber 13 through the inlet 26, and flow downwardly into the spring housing 37, through the apertures 40 in the lower stem bushing 25. Thus, there is maintained a liquid body below the inlet 26, the working parts of the valve below said inlet being maintained in a bath of said cooling liquid. The advantages of this will be apparent. The vapors will not pass downwardly through this liquid body, and danger of oxidation and eventual loss of resiliency of the spring is avoided, by preventing subjection of the spring to continuous contact with the vapors.

Further, where the spring and associated working parts project below the point of radiation, their effectiveness is always at a maximum, eliminating the oxidation and crystallization troubles usually encountered in safety valves of this general character where the spring and associated parts are housed above the zone of heat radiation and upward vapor flow. Unloading valves constructed in accordance with the present invention, have been found very satisfactory for use with oil cracking systems operated under high temperatures and high pressures.

I claim as my invention:

1. In an unloading valve having inlet and outlet, the combination with a vertically movable valve normally contacting with a valve seat, a stem depending vertically below the valve and connected therewith, a cooling chamber, having an inlet for the introduction of cooling liquid enclosing said stem, an adjustable tension coil spring depending below the stem, a cooling chamber enclosing said spring, and means for admitting a cooling liquid thereto, the valve and stem being adapted to compress the spring when the pressure exerted on the valve overcomes the predetermined adjusted tension of the spring.

2. In an unloading valve having inlet and outlet, the combination with a vertically movable valve normally contacting with a valve seat, a stem depending vertically below the valve and connected therewith, a cooling chamber having an inlet for the introduction of cooling liquid enclosing said stem, an adjustable tension coil spring depending below the stem, the valve and stem being adapted to compress the spring when the valve overcomes pressure exerted on the valve overcomes the predetermined adjusted tension of said spring, a closed housing surrounding the spring, and means for communication between the cooling chamber and closed spring housing, whereby the stem and spring are maintained in a bath of cooling liquid.

LYMAN C. HUFF.